(12) United States Patent
Lee et al.

(10) Patent No.: US 7,984,050 B2
(45) Date of Patent: *Jul. 19, 2011

(54) SYSTEM AND METHOD FOR SELECTING SEARCH LISTING IN AN INTERNET SEARCH ENGINE AND ORDERING THE SEARCH LISTINGS

(75) Inventors: Woo Sung Lee, Seoul (KR); Ra Young Yang, Seoul (KR)

(73) Assignee: NHN Business Platform Corporation, Seongnam-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,552

(22) Filed: Aug. 10, 2010

(65) Prior Publication Data

US 2010/0306051 A1    Dec. 2, 2010

Related U.S. Application Data

(63) Continuation of application No. 11/568,011, filed as application No. PCT/KR2005/001103 on Apr. 18, 2005, now Pat. No. 7,801,892.

(30) Foreign Application Priority Data

Apr. 17, 2004 (KR) .......................... 10-2004-0026425

(51) Int. Cl.
*G06F 17/30* (2006.01)

(52) U.S. Cl. .................. 707/735; 705/14.48; 705/14.68
(58) Field of Classification Search .................. 707/735; 705/14.48, 14.68

See application file for complete search history.

(56) References Cited

U.S. PATENT DOCUMENTS

| | | |
|---|---|---|
| 2001/0047354 A1 | 11/2001 | Davis et al. |
| 2003/0055729 A1 | 3/2003 | Bezos et al. |
| 2003/0220918 A1 | 11/2003 | Roy et al. |
| 2004/0044571 A1 | 3/2004 | Bronnimann et al. |
| 2004/0059708 A1 | 3/2004 | Dean et al. |
| 2004/0068460 A1 | 4/2004 | Feeley et al. |
| 2007/0033531 A1 | 2/2007 | Marsh |

FOREIGN PATENT DOCUMENTS

| | | |
|---|---|---|
| JP | 14-063474 | 2/2002 |
| KR | 2000-036454 | 7/2000 |
| KR | 2001109576 | 12/2001 |
| KR | 2001086259 | 3/2002 |
| KR | 2002019042 | 3/2002 |

*Primary Examiner* — James Trujillo
*Assistant Examiner* — William Spieler
(74) *Attorney, Agent, or Firm* — Husch Blackwell LLP

(57) ABSTRACT

Provided is a keyword advertising system for extracting search listings in response to a search request. The system comprises a memory for storing a search information database; a bid control module selecting a predetermined number of search listings primarily according to the bid amount and an estimated advertising period; a ranking module generating an ordered search result list; and a computation control module computing the advertising period for the received bids. The ranking module orders the selected search listings in the search result list according to the selected search listings' respective bid amounts and the estimated advertising period and the computation control module estimating advertising costs uses the bid amount of the advertiser and average number of clicks information during a predetermined previous period. The computation control module further calculates the estimated advertising period using deposit from the advertiser and the estimated advertising costs. The search information database stores at least one bid received from advertisers, the at least one bid being associated with a cost per click advertising, the each bid being associated with a keyword, a bid amount and a search listing.

3 Claims, 14 Drawing Sheets

FIG. 3

<SEARCH INFORMATION DATABASE>

| KEYWORD | BID PRICE INFO | SEARCH LISTINGS | ADVERTISERS |
|---|---|---|---|
| cafe | 1,000 won | naver cafeiN -naver cafe service, meeting, fan club, cafe searching, popularity :::: http://cafe.naver.com | naver cafeiN |
| | 950 won | daum cafe -open club service, popularity ::::: http://cafe.daum.net | daum cafe |
| | 900 won | junjihyun fan cafe -naver junjihyun fan cafe, photos and articles popularity :::: http://cafe.naver.com/sheiscool.cafe | junjihyun fan cafe |
| | 850 won | two some place -Europe styled cafe, products, menu and map popularity ::: http://twosome.co.kr/ | two some place |

FIG. 5

| WEB SEARCH | CAFE | SEARCH |

| WEB SEARCH | DIRECTORIES | | | ......... | | sorting method:　　　　naver rankings▽　|　relevance: ▽　|　popularity: ▽　|　registration date: ▽ junjihyun fan cafe　- naver junjihhun fan cafe .........

naver cafeiN　　　- naver cafe service, friendship .........

daum cafe　　　　-open club service.

two some place　　- Europe styled cafe.........

FIG. 7

<SEARCH INFORMATION DATABASE>

| KEYWORD | BID PRICE INFO | SEARCH LISTINGS | ADVERTISERS |
|---|---|---|---|
| cafe | 1,000 won | naver cafeiN -naver cafe service, meeting, fan club, cafe searching, popularity :::: http://cafe.naver.com | naver cafeiN |
| | 950 won | daum cafe -open club service, popularity ::::: http://cafe.daum.net | daum cafe |
| | 900 won | junjihyun fan cafe -naver junjihyun fan cafe, photos and articles popularity :::: http://cafe.naver.com/sheiscool.cafe | junjihyun fan cafe |
| | 850 won | two some place -Europe styled cafe, products, menu and map popularity ::: http://twosome.co.kr/ | two some place |

FIG. 9

| WEB SEARCH | CAFE | SEARCH |

| WEB SEARCH | DIRECTORIES | | | ......... | | sorting method:   naver rankings▽  | relevance: ▽ | popularity: ▽ | registration date: ▽ naver cafeiN   - naver cafe service, friendship .........

two some place   - Europe styled cafe.........

daum cafe   -open club service.

junjihyun fan cafe   - naver junjihhun fan cafe .........

1400

SYSTEM AND METHOD FOR SELECTING SEARCH LISTING IN AN INTERNET SEARCH ENGINE AND ORDERING THE SEARCH LISTINGS

CROSS-REFERENCE TO RELATED APPLICATION

This application is a continuation application of the prior non-provisional patent application Ser. No. 11/568,011 filed on Oct. 17, 2006, which claims the benefit of priority from the PCT Application No. PCT/KR2005/001103 filed on Apr. 18, 2005 and Korean Patent Application No. 10-2004-0026425 filed on Apr. 17, 2004. The disclosures of the non-provisional patent application Ser. No. 11/568,011, the PCT Application No. PCT/KR2005/001103 and Korean Patent Application No. 10-2004-0026425 are incorporated herein by reference.

BACKGROUND OF THE INVENTION

The present invention relates to keyword advertising system and method for extracting search listings in response to a search request. More particularly, the present invention relates to keyword advertising system and method for exposing at least one search listing which is extracted in response to the search request, in accordance with another standard data, besides the size of a bid price.

Today, information searches through a communication network are being generalized, together with rapid development in the field of communication networks such as the Internet and the like. A user (a searcher) can obtain necessary information easily anytime and anywhere by using the Internet. In addition, such information searches bring a lot of changes to our daily lives.

Therefore, there are developed and suggested various models with respect to types of payments of advertising costs between an operator and an advertiser. At this time, the operator supports search services for Internet users and the advertiser expresses his/her own information site through a search, thereby obtaining advertising effects.

A general method among the methods for paying advertising costs is to expose advertiser information and determine advertising costs by a cost per click (hereinafter, CPC) method. The CPC method computes advertising costs based on the number of connections between a searcher and an advertiser when the searcher who requests the search clicks advertising information of the advertiser. That is, in the CPC method, information is exposed and provided in such a manner that advertising information of the advertiser who has suggested the highest CPC value (charge amount per click) is displayed on the highest portion of a predetermined search screen where searchers can recognize advertising information easily. That is, the CPC method sorts search results in order of the size of CPC provided by the advertiser and provides the searcher with the sorted search results.

However, the CPC method has a problem that only advertising information of an advertiser who inputs a higher CPC value is preferentially extracted or is provided on a display location where it is easy to induce a click of a searcher. It acts as an element which enables the advertiser who wants to provide advertising information thereof as results for the search request to raise a bid price. Thus, heavy advertising costs may be charged to the advertiser.

In addition, an advertising contract period is not considered in a method for paying advertising costs by the CPC method. Thus, there is a disadvantage that intention of an advertiser who wants to make a long-term advertising contract is not reflected. That is, generally, an advertising contract of maintaining an advertising period to be long has a lower bid price. Thus, in a method for exposing advertising information by considering only a bid price, there is another disadvantage that advertising information of the advertiser who has made a long-term advertising contract may be provided to a display location where recognition of searchers is comparatively low.

Furthermore, according to the prior art, a click of advertising search items, which are exposed as results of search, and ordering of the selected items are performed on the basis of the same criterion. Thus, there is required a method which can make a balance between profits of an advertiser associated with Internet search advertising and those of a searcher.

Furthermore, there is required a new type of a model for paying advertising costs which can appropriately reflect various desires of an advertiser by applying another criterion besides a bid price and exposing advertising information. In addition, there is also required a model for charging advertising costs, which can reasonably charge advertising costs by enabling the advertising costs for exposed search listings to be paid through one time click.

SUMMARY OF INVENTION

The present invention is conceived to solve the aforementioned problems. Thus, the present invention provides keyword advertising system and method which can reflect popularity of search listings and faithfulness of a corresponding information site by selecting the predetermined number of search listings based on a bid price in response to a search request and determining locations of selected search listings in a search result list based on click through rate.

The present invention also provides keyword advertising system and method which can bring better advertising effects to an advertiser who suggests a high bid price or maintains a long-term advertising contract by extracting search listings and determining locations thereof in accordance with class values and by providing a searcher with the sorted search listings as a result of a search request, in which the class value is computed based on a bid price and advertising period.

The present invention also provides keyword advertising system and method which enables a reasonable payment by charging an advertiser in accordance with a click of a searcher with respect to search listings sorted in a search result list and brings economical and effective advertising effects to the advertiser.

In order to achieve the above goals, there is provided a keyword advertising system extracting search listings in response to a search request, comprising: an interface receiving bid price information corresponding to a keyword from advertisers; a search information database storing search listings associated with the advertisers in association with each of the received bid price information; a ranking module generating a search result list by referring to the search information database, in response to a search request from a searcher; and a search results providing module providing the searcher with the generated search result list; wherein the ranking module generates the search result list by performing the steps of: identifying a keyword received from the searcher in association with the search request; selecting N of search listings from the at least one search result listing corresponding to the identified keyword, based on the bid price information; and ordering the selected search listings in order of click through rate.

Also, there is provided a keyword advertising method extracting search listings in response to a search request, comprising the steps of: maintaining a search information database storing bid price information received in correspondence to a keyword in association with search listings of advertisers; selecting N of advertisers as successful bidders with respect to the keyword, based on the bid price information and predetermined weight; receiving a keyword associated with the search request; generating a search result list by ordering search listings associated with the N of advertisers, who are selected as successful bidders in accordance with the bid price information and the weight in response to the received keyword; and providing the searcher with the generated search result list.

BRIEF DESCRIPTION OF DRAWINGS

FIG. 3 is a view illustrating one example of configuration of a search information database according to the present invention, FIG. 5 is a view illustrating one example of a search result list provided to a searcher;

FIG. 7 is a view illustrating one example of configuration of a search information database for selecting a successful bidder according to the present invention, FIG. 9 is a view illustrating another example of a search result list provided to a searcher;

BEST MODE FOR CARRYING OUT THE INVENTION

Hereinafter, keyword advertising system and method for extracting search listings in response to a search request will be described with reference to the accompanying drawings.

A search listing continuously used herein may be one item of search results which are extracted in correspondence to a particular keyword inputted in a search engine and provided to a searcher who has requested a search. One search listing may include brief information on an information site of an advertiser, such as a content title, a content summary, a network address, and the like. For example, in FIG. 5, one search listing is extracted by keyword 'cafe'. The search listing includes a content title, "naver cafeiN", a network address, "http://cafe.naver.com", a content summary, and the like. In addition, a search result list is search results with respect to the search request of the searcher. Thus, the search result list may be a list of search listings provided to the searcher by processing at least one search listing in accordance with a predetermined sorting order. At this time, the sorting order is in order to make exposure locations (exposure order) of extracted search listings different in accordance with a particular criterion. Thus, the sorting order may be flexibly determined by an operator of each search engine supporting a search request service. In the present embodiment, the sorting order is determined in accordance with bid price information based on click through rate (hereinafter, CTR) of each search listing or information on advertising period thereof. The click through rate (CTR) is the average number of click-throughs per hundred search listing impressions. The click through rate measures the number of clicks on a search listing in a search result list displayed in response to a searcher's search request over the impression of the search listing.

Figure 1:
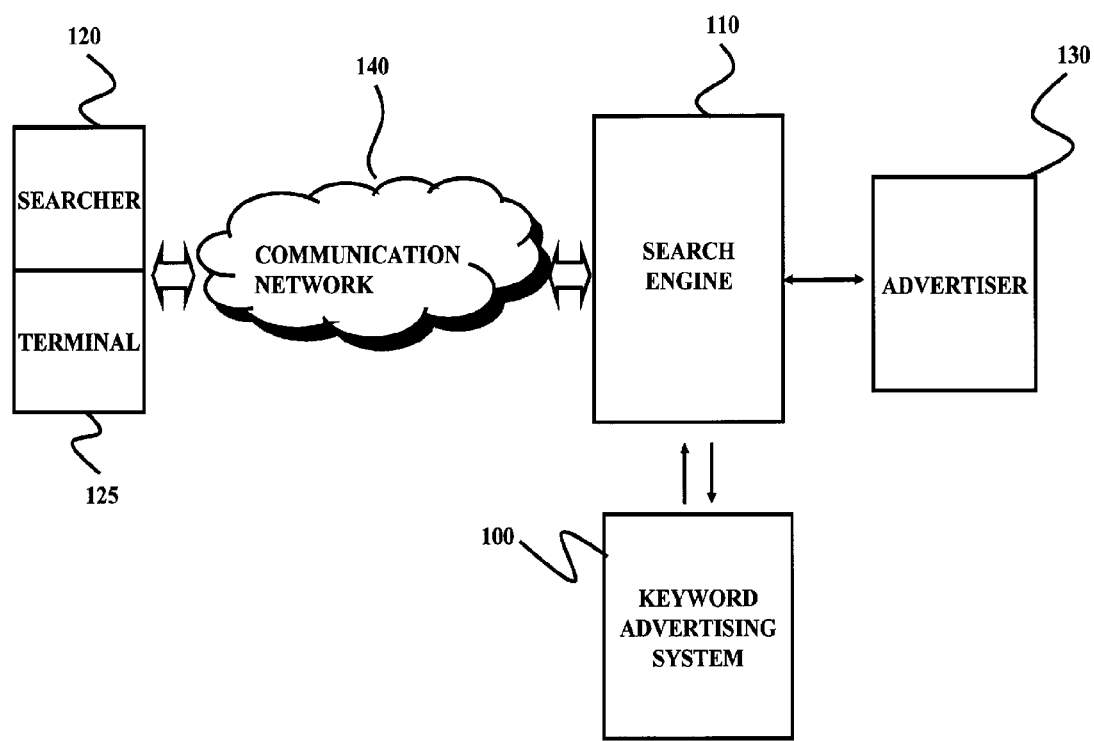
FIG. 1 is a view illustrating schematic configuration of a keyword advertising system according to the present invention.

FIG. 1 is a view illustrating schematic configuration of a keyword advertising system according to the present invention.

A keyword advertising system 100 extracts the predetermined number of search listings in correspondence to a keyword inputted in a search engine 110 to request a search. Also, the keyword advertising system enables the extracted search listings to be sorted in accordance with the size of the bid price of each search listing. For this, when a keyword is inputted, the keyword advertising system 100 receives bid price information from an advertiser 130 who wants corresponding search listings to be extracted. Also, the keyword advertising system 100 generates at least one search listing and provides the generated search listings to a searcher 120 who has requested the search. The search listings are sorted in order of the size of the bid price.

First, the search engine 110 may be a search program or a search web server which supports searching operations to access a web site maintaining contents materials that the searcher 120 wants to find. That is, the search engine 110 serves to save a time in searching for contents materials and enhance accuracy thereof by providing brief information (preferably, search listings of the present invention) on the advertisers 130 who can provide information what the searcher 120 demands, in response to a search request of the searcher 120. Particularly, each of brief information (search listing) includes predetermined link information. Thus, when the searcher 120 clicks brief information (search listing) displayed on a terminal 125 by using an instruction input device such as a mouse, the search engine 110 enables a connection between the advertiser 130 and the searcher 120. The search engine 110 can be classified into word-oriented searching and subject-oriented searching. Herein, in order to achieve the purpose of the present invention to display particular search listings, which are extracted in correspondence to the inputted keyword, on a search screen in accordance with a selected criterion, a searching method of the search engine 110 is limited to the word-oriented searching. However, this is only for convenience of description and it will be apparent to those skilled in the related art that technical spirits of the present invention is not limited thereto.

The searcher 120 may be an internet user who has the terminal 125 for access to the keyword advertising system 100 and generates a search request for an information site of the advertiser 130 who maintains contents materials that the searcher 120 wants to search, by inputting a keyword into the search engine 110.

The advertiser 130 is, for example, a contents provider (CP) who operates an information site whose location is designated on a network by a network address such as an IP address, a URL, a domain, or the like. Therefore, the advertiser 130 pays predetermined advertising costs to the system operator of the present invention, in accordance with a click of the searcher 120 with respect to search listings of the information site.

The terminal 125 maintains a connection state with the keyword advertising system 100 through a communication network 140, such as the Internet and the like. The terminal 125 displays at least one search listing extracted by searching of the search engine 110 on a predetermined screen. Like above, the terminal 125 may be a general concept for terminals with a computing function by mounting a predetermined memory means and a predetermined microprocessor, such as for example, personal computers, handheld computers, Personal Digital Assistants (PDA), MP3 players, electric dictionaries, cellular phones, smart phones, and the like.

The keyword advertising system 100 sorts at least one search listing corresponding to each keyword, on the basis of the predetermined size of a bid price or the size of a bid price and predetermined weight, in association with display of search listings. Particularly, the keyword advertising system 100 enables advertising costs to be charged reasonably by charging the advertiser 130 advertising costs for search listings provided to the searcher 120 in accordance with a click thereof 120 with respect to the provided search listings. Hereinafter, configuration of a keyword advertising system 200 according to the present invention will be described with reference to FIG. 2.

Figure 2:
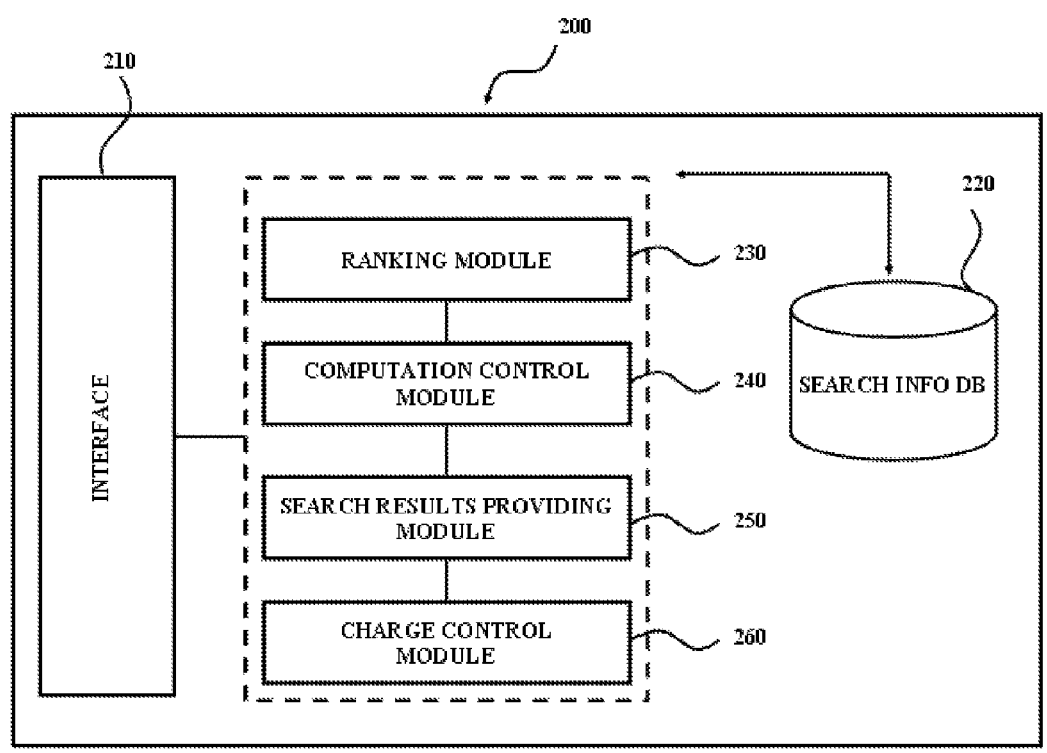
FIG. 2 is a configuration diagram illustrating a keyword advertising system 200 according to a preferred embodiment of the present invention.

FIG. 2 is a configuration diagram of the keyword advertising system 200 according to a preferred embodiment of the present invention.

The keyword advertising system 200 includes an interface 210, a search information database 220, a list generating mean 230, a computation control module 240, a search results providing module 250 and a charge control module 260.

First, the interface 210 receives bid price information corresponding to a keyword from the advertiser 130. The interface 210 serves to receive bid price information as betting data to determine exposure locations (sorting locations herein) of search listings associated with the advertisers 130. At this time, bid price information may be information on a charge amount (an amount that the advertiser 130 can pay) generating when any of search listings extracted in response to a search request is clicked by the searcher 120 using an instruction input device of. For example, the charge amount includes unit click cost by one-click for search listings of the searcher 120, unit exposure cost by providing a search list to the searcher 120, unit purchase cost by success of a transaction between the advertiser 130 and the searcher 120 who is connected thereto 130. In the present embodiment, unit click cost is set as a charge amount, which is for convenience of description. For example, referring to FIG. 3, there are four pieces of bid price information in correspondence to keyword 'cafe' and four search listings associated with each of the advertisers 130 are exposed on a search screen and await a click of the searcher 120. For example, in case that the searcher 120 clicks a search listing associated with advertiser 'naver cafeiN', advertising costs '1000 won', which is included in bid price information, is charged to the advertiser 'naver cafeiN'. That is, the interface 210 serves to recognize intention of the advertisers 130, based on bid price information. At this time, the advertisers 130 want search listings to be extracted in correspondence to an inputted keyword. The bid price information includes information on cost per one-click (unit click cost) of the searcher 120 with respect to search listings.

The search information database 220 stores search listings associated with the advertisers 130 in association with each of inputted bid price information. That is, the search information database 220 serves to store search listings associated with the advertisers 130 in connection with the bid price information and the search listings are generated or received at a predetermined point of time. It is because the bid price information is related to extraction of a search listing and determination of a sorting location of the extracted search listing. For example, as illustrated in FIG. 3, bid price information '1000 won' inputted by the advertiser 'naver cafeiN' is stored in association with the search listing of the advertiser 'naver cafeiN'. In addition, the search information database 220 can store all the bid price information corresponding to a keyword which induces extraction of search listings. Thus, all the search listings that can be extracted in correspondence to the keyword are stored in the search information database 220. Hereinafter, it will be described bid price information inputted and search listings extracted in correspondence to the keyword by referring to FIG. 3.

FIG. 3 is a view illustrating one example of configuration of a search information database according to the present invention.

In FIG. 3, the predetermined size of bid price information is received from the advertiser 130 who wants to display a search listing as a search result in correspondence to the inputted keyword 'cafe'. Bid price information received by the interface 210 includes information on the size of advertising costs generating when an associated search listing is clicked by the searcher 120. The search information database 220 of FIG. 3 makes search listings associated with advertisers, 'naver cafeiN', 'daum cafe', 'junjihyun fan cafe', and 'two some place' correspond to the keyword 'cafe'. Also, the search information database 220 stores the search listings in association with the respectively received bid price information. Thus, when the keyword 'cafe' is inputted in the search engine 110 to request a search, the search listings associated with the advertisers, 'naver cafeiN', 'daum cafe', 'junjihyun fan cafe', and 'two some place', are determined as search listings to be extracted as search results. At this time, the determined search listings may be those of all the advertisers 130 who have inputted bid price information. Or, the determined search listings may be N (N≦4) of search listings and N may be set by the system operator. That is, when N is set at '2', search listings to be extracted may be limited to two of search listings in accordance with the size of a bid price, which is advertisers 'naver cafeiN' and 'daum cafe', by the ranking module 230. This will be described later.

In addition, numerical data inputted as bid price information is associated with unit click cost corresponding to advertising costs charged to the advertiser 130. The numerical data is a cost to be charged the corresponding advertiser 130 when the searcher 120 clicks the provided search listing once. For example, bid price information inputted by the advertiser 'naver cafeiN' includes unit click cost of '1000 won'. Thus, when the searcher 120 clicks the search listing associated with the extracted advertiser 'naver cafeiN', advertising costs of 1000 won is charged the advertiser 'naver cafeiN' or extracted from predetermined advertising deposit of an account associated with the advertiser 'naver cafeiN'. As aforementioned, unit exposure cost, unit purchase cost and the like, besides unit click cost, can be received from the advertiser 130 as bid price information. At this time, a payment of advertising costs may be performed as same or similarly as that of unit click cost.

The ranking module 230 generates a search result list by referring to the search information database 220, in response to a search request from the searcher 120. That is, the ranking module 230 serves to generate a search result list by extracting the predetermined number of search listings corresponding to a keyword and determine the sorting locations thereof in the search result list. At this time, the search result list may be search results provided to the searcher 120 who has requested the search. Also, the search result list displays each of the extracted search listings at respectively different positions in accordance with the determined sorting locations. Moreover, the sorting location is to determine the screen arrangements of search listings which will be displayed for the searcher 120. Thus, the sorting location is determined by considering an actual click connection rate or advertising period according to exposure locations of search listings. The sorting location causes a difference in recognition of the searcher 120 with respect to search listings in accordance with exposure locations thereof on a screen. Accordingly, there is a difference in frequency of actual connections between the searcher 120 and the advertiser 130. Generally, in case that at least one search listing is extracted, there is an effect that an actual click connection rate is high with respect to a previously displayed search listing and advertising effects are also enhanced. The ranking module 230 determines sorting locations such that search listings with high bid price information are sequentially displayed from an upper portion of a search screen where the actual click connection rate is high. Hereinafter, a method of generating a search list by the ranking module 230 will be described with reference to FIG. 4.

Figure 4:
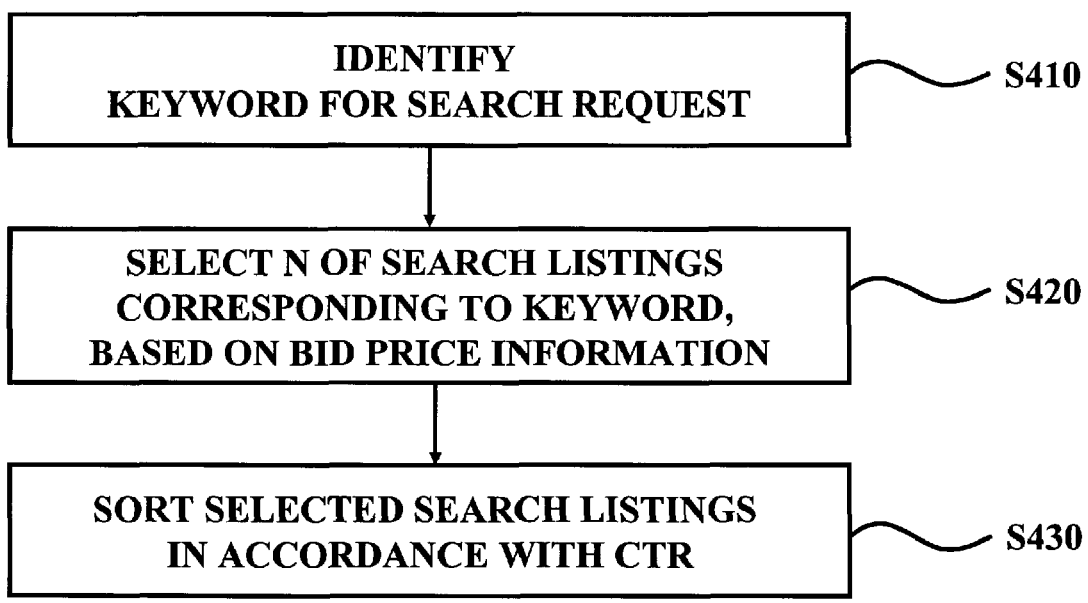
FIG. 4 is a flowchart illustrating one example of a method for generating a search result list by a ranking module.

FIG. 4 is a flowchart illustrating one example of a method for generating a search result list by a ranking module.

First, the ranking module 230 identifies a keyword received from the searcher 120 in association with a search request (S410). This step S410 is a procedure for confirming the keyword inputted in the search engine 110 to request a search and recognizing at least one search listing corresponding to the confirmed keyword from the search information database 220. The keyword may be a compound word consisting of one substantive or a plurality of substantives. In step S410, the ranking module 230 may identify a search keyword from a query inputted by user, by analyzing the query and selecting a word from the query if the query comprises a plurality of words. If there is no matched keyword to the inputted query in the search database, the ranking module 230 may try a synonymous word with the query.

Also, the ranking module 230 selects N of search listings from one or more search listings corresponding to the identified keyword, based on bid price information (S420). This step S420 is a procedure for comparing unit click cost of bid price information in extracting N of search listings corresponding to the keyword and for extracting the search listings in order of high unit click cost. That is, in extracting search listings, the ranking module 230 preferentially extracts a search listing of the advertiser 130 who is willing to pay high advertising costs. At this time, N is the number of search listings to be selected and flexibly set by the system operator considering a space of a search screen where a search result list is displayed. As aforementioned, it may be preferable that N is same to the number of search listings which are stored in the search information database 220 in correspondence to the inputted keyword. This is in order to bring more advertising profits to the system operator by extracting the maximum search listings in correspondence to the keyword.

In the next, the ranking module 230 sorts the search listings in order of click through rate (hereinafter, CTR) (S430). This step S430 is a procedure for ordering extracted search listings on a search result list, based on ratio of the number of actual clicks versus the number of exposures of search listings, in order to reflect popularity of the searcher 120 with respect to search listings. The CTR is computed based on the number of times that a particular search listing is displayed on the search result list during a predetermined previous period (the number of exposures) and the number of times that there is a connection between the searcher 120 and the advertiser 130 by a valid click (a click inducing an actual connection) with respect to the particular search listing. The higher the CTR, the better popularity of the searcher 120 or the higher connection probability to an information site of the advertiser 130 gets.

According to the present invention, the predetermined number of search listings is selected based on a bid price and locations of the selected search listings in a search result list are determined based on the CTR. Thus, there is an advantage that it is possible to provide searchers with search results in which popularity of search listings and faithfulness of a corresponding information site are reflected.

Hereinafter, a search result list generated by the ranking module 230 will be described with reference to FIG. 5.

FIG. 5 is a view illustrating one example of a search result list provided to a searcher according to the present invention.

As illustrated in FIG. 5, a search result list displays at least one search listing, which is extracted in response to a search request, in accordance with a predetermined sorting order and provides the same to the searcher 120 as search results for the search request. As aforementioned, the order of search listings in the search result list is determined in accordance with the CTR of each search listing. Hereinafter, it will be described based on a click rate versus exposure of each search listing stored in the search information database 220 of FIG. 3.

In case that N is set at '4' by the system operator, the keyword advertising system 200 of the present invention extracts four search listings in order of a high bid price by referring to bid price information which is recorded in FIG. 3. The extracted search listings are associated with advertisers, 'naver cafeiN', 'daum cafe', 'junjihyun fan cafe' and 'two some place'. Locations thereof are determined by confirming the CTR of each search listing. For example, although the search listing associated with the advertiser 'naver cafeiN' includes the highest bid price, the CTR thereof is 0.305 which is next to the advertiser 'daum cafe' whose CTR is 0.417. Thus, the search listing associated with the advertiser 'naver cafeiN' ranks a second place in a search result list, as illustrated in FIG. 5. Also, the sorting locations are determined such that the search listing associated with the advertiser 'daum cafe' with the highest CTR is displayed in the highest portion of a search result list.

The present invention provides the searcher 120 with search listings sorted in accordance with the CTR reflecting popularity, as results of a search request. Thus, there is an advantage that it is possible to display the optimum search results that the searcher 120 wants in a location where the searcher 120 can easily recognize the search results. Also, according to the present invention, the CTR, not an existing bid price, acts as a decisive element in determining the sorting locations. Thus, there is an effect that it is possible to improve quality of an information site of the advertiser 130. That is, according to the present invention, search listings to be exposed as search results are determined in accordance with bid price information thereof. Thus, there is an advantage that it is possible to protect profits of advertisers to some degree. Also, since orders of search listings are determined based on the CTR, there is another advantage that it is possible to protect benefits of searchers. Also, according to another embodiment of the present invention, it is possible to employ a method of determining orders of search listings by considering both the CTR and bid price and exposing the same in determined order.

In order to compute the CTR, the keyword advertising system 200 of the present invention further includes the computation control module 240. That is, the computation control module 240 serves to compute the CTR of a search listing which is sorted in each search result list. At this time, the CTR may be computed based on the number of valid clicks of the searcher with respect to search listings versus the number of selections thereof for ordering the search listings in a search result list. That is, the CTR is computed by ratio of the number that a particular search listing is provided to the searchers as search results and the number that the provided search listing is clicked by searchers. If searchers click the particular search listing, the searchers can access the web site of the corresponding advertiser. Through this, it is possible to estimate popularity for the information site of the advertiser 130. At this time, the number of valid clicks which are associated with computation of the CTR may be defined as the number of clicks of the searcher 120, which generate before or after a load time, by using a predetermined time, for example, the load time. The load time is a time taken until information of the information site is displayed on the terminal 125 of the searcher 120 after the click. That is, in case that the searcher 120 inputs a first click with respect to the particular search listing and later inputs a second click with respect to the same, the computation control module 240 determines the second click to be invalid and does not count. Thus, it is possible to compute the accurate CTR by adding up only a click of the searcher 120 generating advertising effects. Also, there is another effect that it is possible to charge the advertiser 130 more reasonably in computing advertising costs with respect to each of search listings.

Referring to FIG. 2 again, the search results providing module 250 provides the searcher 120 with a generated search result list. That is, the search results providing module 250 serves to display the generated search result list on the terminal 125 of the searcher 120 as search results, in response to a search request of the searcher 120 (refer to FIG. 5).

That is, the present invention extracts the predetermined number of search listings in accordance with the size of a bid price, sorts the extracted search listings in accordance with the CTR and then provides the searcher 120 with the sorted search listings. Thus, there is an effect that it is possible to display the optimum search listing that the searcher 120 wants in an upper portion.

Hereinafter, as another embodiment of the present invention, it will be described that predetermined advertising costs generate per unit click for a particular search listing and the generated advertising costs are charged to the advertiser 130.

For this, the keyword advertising system 200 of the present invention may further include the charge control module 260.

That is, the charge control module 260 generates advertising costs information in response to a click of the searcher 120 with respect to the search listings which are sorted in the search result list. That is, the charge control module 260 serves to determine advertising costs to be charged in accordance with a click of the searcher 120. For example, the charge control module 260 enables charging process to be completed by subtracting unit click cost from advertising deposit of an account, in interoperation with one-click of the searcher 120. At this time, advertising costs to be subtracted may be unit exposure cost by exposing search listings in a search result list or unit purchase cost by a click of the searcher 120 for substantial purchase, besides the aforementioned unit click cost.

The present invention charges the advertiser 130 advertising costs in accordance with a click of the searcher 120 with respect to search listings of a search result list. Thus, there is an advantage that it is possible to charge the advertiser 130 more reasonably and to bring more economical and effective advertising effects to the advertiser 130.

In the present embodiment, advertising costs generate at a point when one-click of the searcher 120 with respect to search listings is completed. However, this is only one embodiment of the present invention. It will be apparent to those skilled in the related art that advertising costs may generate at various points. For example, in case that unit exposure cost or unit purchase cost is included in bid price information, advertising costs may generate at a point when search listings are exposed or at a point when a predetermined purchase button is clicked by the searcher using an instruction input device or the like.

Hereinafter, as another embodiment of the present invention, it will be described that an advertising period of each search listing is considered in extracting and ordering search listings, besides a bid price. For this, a keyword advertising system 600 of the present invention may include a search information database 610, a bid control module 620, a computation control module 630, an interface 640, a ranking module 650, and a search results providing module 660.

Figure 6:
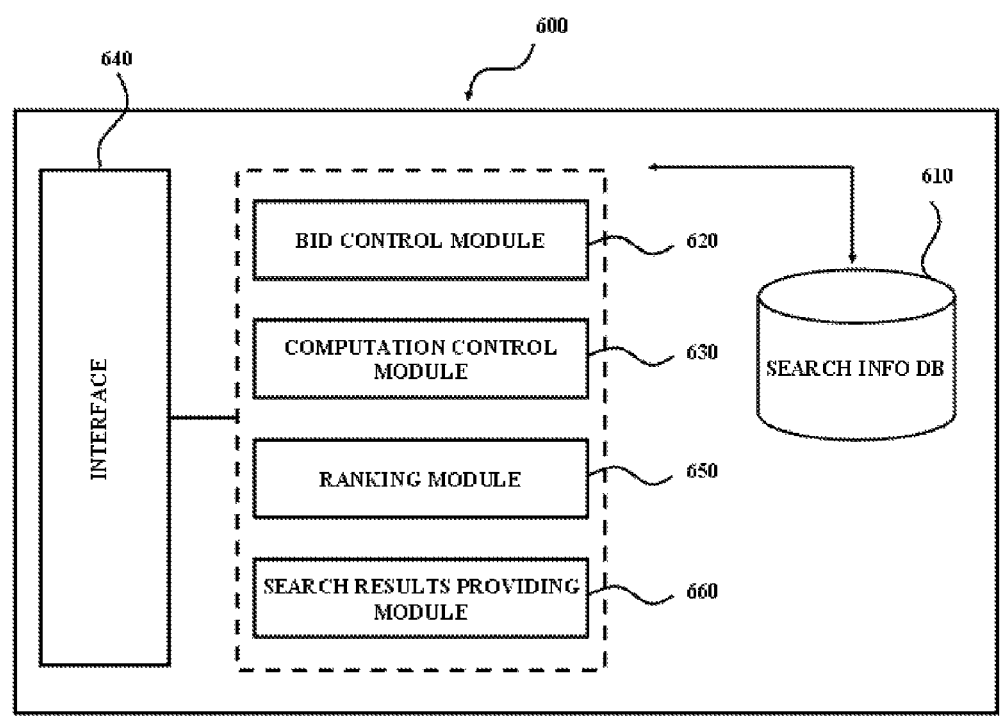
FIG. 6 is a view illustrating one example of configuration of a keyword advertising system according to another embodiment of the present invention.

FIG. 6 is a view illustrating one example of configuration of a keyword advertising system according to another embodiment of the present invention.

First, the search information database 610 stores bid price information, which is received in correspondence to a keyword, in association with search listings of the advertisers 130. For example, the search information database 610 serves to receive predetermined bid price information from at least one advertiser 130 through the interface 640. Also, the search information database 610 serves to store the received bid price information in association with search listings associated with the advertisers 130. That is, information recorded in the search information database 610 includes at least one piece of bid price information corresponding to one keyword and search listing associated with the advertiser 130 who inputs bid price information, in which the bid price information and the search listing are related to each other. Through this, it is possible to recognize information with respect to a keyword associated with extraction of search listings, extractable search listings and the like.

The bid control module 620 selects N of advertisers 130 as successful bidders based on bid price information and predetermined weight, in correspondence to a keyword. The bid control module 620 serves to give rankings to the advertisers 130 who input bid price information in correspondence to the keyword, based on a predetermined criterion. Also, the bid control module 620 serves to select advertisers 130 who are included within Nth rankings. At this time, the weight is a variable element in determining rankings of the advertisers 130. For example, the weight may be popularity of an information site of the advertiser 130, Unique Visitor (UV) to the information site and Return On Investment (ROI), and the like. The weight may be flexibly set by the system operator. In the present embodiment, the weight may be information on advertising period of search listings of the advertisers 130.

That is, the predetermined criterion to determine rankings of the advertisers 130 may be set by a computing combination of bid price information and advertising period of search listings. Hereinafter, it will be described that a successful bidder is determined among a plurality of advertisers 130 by the bid control module 620.

FIG. 7 is a view illustrating one example of configuration of a search information database for selecting a successful bidder according to the present invention.

As illustrated in FIG. 7, the search information database 610 includes at least one piece of bid price information corresponding to a keyword and search listings associated with each of the bid price information. Also, the search information database 610 stores information on an advertising period of each search listing. The advertising period can be used in determining a successful bidder among advertisers 130 by the bid control module 620. The successful bidder by the bid control module 620 is determined, for example, in accordance with a class value which is given by multiplication of a bid price and advertising period. N of advertisers 130 are determined as successful bidders 130, which is in order of a high class value with respect to each of search listings. For example, as illustrated in FIG. 7, the bid price inputted by the advertiser 'naver cafeiN' is '1000 won' and the advertising period of the relevant search listing is '12 weeks'. Thus, a class value given to the advertiser 'naver cafeiN' is '12,000' (=12×1000). The '12,000' is stored. In the same way, the class value can be given to each of advertisers 130. Thus, the bid control module 620 selects successful bidders in order of a high class value, which is in order of the advertisers, 'naver cafeiN', 'two some place', 'daum cafe', and 'jujinhyun fan cafe'.

Information on such advertising period is received directly from the advertiser 130 or generated by estimating a period until predetermined advertising deposit disappears. Hereinafter, an embodiment related thereto will be described.

First, in case that information on advertising period is received directly from the advertiser 130, the keyword advertising system 600 of the present invention transmits a user interface for inputting the advertising period, to a terminal (not illustrated) of the advertiser 130. Also, the keyword advertising system 600 receives information on advertising period, for example, through the interface 640. The information on advertising period generates when the advertiser 130 inputs a predetermined numerical value in the transmitted user interface. In the present embodiment, information on the advertising period of a search listing associated with the advertiser 130 is received directly from the advertiser 130. Thus, there is an effect that the advertiser 130 can change/set the advertising period flexibly and aggressively.

In the meantime, in case that information on advertising period is generated by estimating a period until advertising deposit disappears, the keyword advertising system 600 of the present invention maintains information on the number of daily clicks by each location on a search result list and computes estimated daily advertising costs with respect to each of locations, based on the information on the number of daily clicks. That is, the keyword advertising system 600 can estimate a time when advertising deposit disappears by analyzing a tendency that the advertising deposit of an account associated with the advertiser 130 is being subtracted. Thus, the keyword advertising system 600 generates information on advertising period using a period from a time when a corresponding search listing is displayed in a search result list for the first time to the estimated time when the advertising deposit disappears. The keyword advertising system 600 stores the generated information on advertising period in the search information database 610. In order to compute the information on advertising period, the keyword advertising system 600 of the present invention further includes the computation control module 630. That is, the computation control module 630 computes information on advertising period for which the search listings associated with the advertisers 130 are maintained in a search result list. Hereinafter, computing of information on advertising period by the computation control module 630 will be described with reference to FIG. 8.

Figure 8:
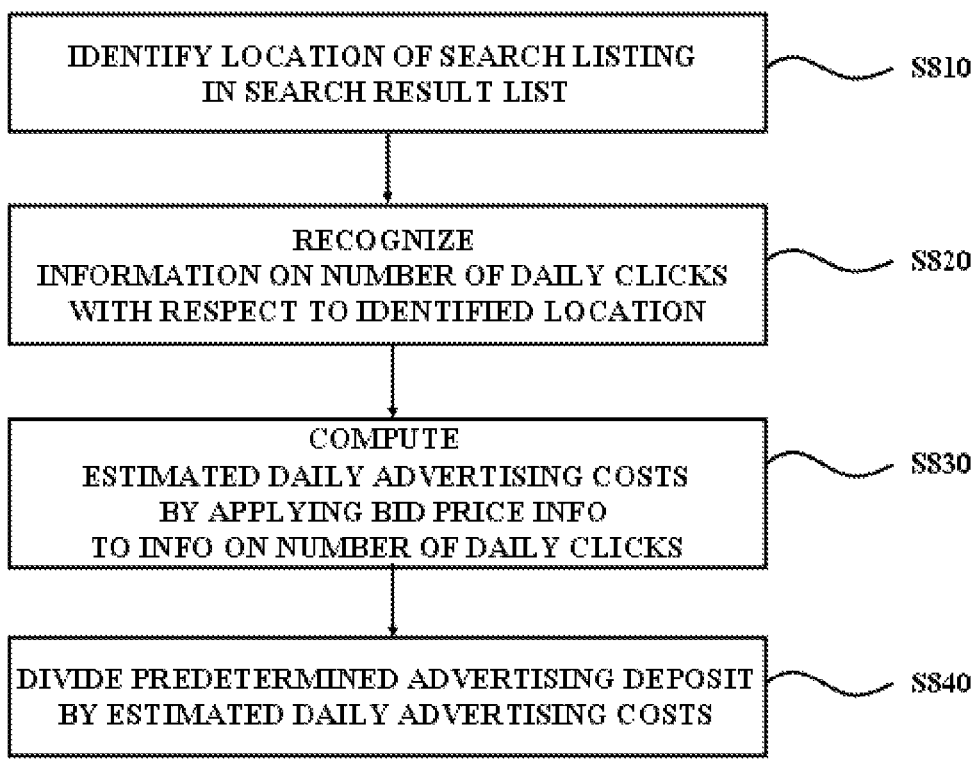
FIG. 8 is a flowchart illustrating one example of a method for estimating a time when advertising deposit disappears based on information on the number of daily clicks.

FIG. 8 is a flowchart illustrating one example of a method for estimating a time when advertising deposit disappears based on information on the number of daily clicks.

First, the computation control module 630 identifies a location of a search listing associated with the advertiser 130 in a search result list (S810). This step S810 is a procedure for recognizing an exposure location on a search result list with respect to a particular search listing. For example, the location of the search listing associated with the advertiser 'naver cafeiN' of which a class value is highest is determined to be in the highest portion of a search result list (refer to FIG. 9).

Also, the computation control module 630 recognizes information on the number of daily clicks with respect to the identified location, through a predetermined memory means 635 (S820). This step S820 is a procedure for confirming the number of average daily clicks with respect to the particular location during a predetermined period. For example, a module for computing the number of clicks (not illustrated) computes the number of valid clicks (the number of clicks causing an actual connection) generating in a particular location during one month (or one year, one week, one day, etc). The module also generates information on the number of daily clicks by dividing the number of measured valid clicks by a measured period. For example, in computing the number of average daily clicks in FIG. 9 in association with the search listing of the advertiser 'naver cafeiN', the module measures the number of total valid clicks, '1,500 times', during '30 days', and generates information on the number of daily clicks, '50 times', by averaging the above. Thus, the generated information on the number of daily clicks is stored in the memory means 635. The information on the number of daily clicks can be updated every period. The period may be set by the system operator. Also, the updated information on the number of daily clicks can be stored in the memory means 635. Thus, it is possible to appropriately reflect a tendency of the number of valid clicks with respect to search listings.

In the next, the computation control module 630 computes estimated daily advertising costs by applying bid price information of the advertiser 130 to information on the number of daily clicks (S830). This step S830 is a procedure for computing estimated daily advertising costs, which are estimated to be subtracted a day, by multiplying the information on the number of daily clicks by bid price information. For example, in FIG. 7, bid price information inputted by the advertiser 'naver cafeiN' is '1,000 won'. Thus, estimated daily advertising costs '50,000 won' is computed by multiplying '1,000won' by '50' which is information on the number of daily clicks generated in the step S830.

In the next, the computation control module 630 divides predetermined advertising deposit by the computed estimated daily advertising costs (S840). This step S840 is a procedure for computing a period (an advertising period) for which a corresponding search listing is maintained in a search result list, based on advertising deposit information first inputted by the advertiser 130. The advertising period is computed by dividing advertising deposit of an account associated with the advertiser 130 by the estimated daily advertising costs computed in the step S830. For example, in case that advertising deposit '500,000' is maintained in an account associated with the advertiser 'naver cafeiN' and estimated daily advertising costs for the search listing are '50,000', the number of days computed as an advertising period is 10 days (500,000/50,000).

That is, the advertising period of each search listing is automatically computed based on the size of advertising deposit which is received from the advertiser 130. Thus, there is an effect that it is possible to reduce inconvenience which may be caused by directly inputting the advertising period. Moreover, in case that the advertiser 130 wants to adjust/change the advertising period, it is possible to control the advertising period by changing (additional payment or withdrawal) a value of advertising deposit maintained in an account.

Referring to FIG. 6 again, the interface 640 receives a keyword in association with a search request. That is, the interface 640 serves to receive a keyword from the searcher 120 to request a search. For example, the interface 640 recognizes the keyword of the searcher 120 inputted in the search engine 110. The keyword is an important element in determining search listings extracted from the search information database 610 as search results. Particularly, the interface 640 may include the user interface provided to the advertiser 130, in connection with payment of advertising deposit to an account associated with the advertiser 130. The user interface controls corresponding advertising deposit to be received to an account which is allocated to the advertiser 130 in interoperation with payment of advertising deposit of the advertiser 130. For example, in order to pay advertising deposit '500,000 won' to an account associated with the advertiser 'naver cafeiN', '500,000' or numerical data enabling accumulated advertising deposit to be '500,000' must be inputted into the user interface provided to the advertiser 130.

The ranking module 650 sorts search listings associated with N of advertisers 130, which are selected as successful bidders in accordance with bid price information and predetermined weight in response to the received keyword. In the next, the ranking module 650 generates a search result list. That is, while the ranking module 650 generates a search result list by extracting search listings of successful advertisers 130, it 650 serves to determine the location of each extracted search listing in a search result list. The ranking module 650 determines the location in accordance with the size of a class value which is given to each of search listings. At this time, the ranking module 650 may enable search listings with high class values to be provided sequentially from an upper portion of a search screen. That is, the ranking module 650 computes the class values by applying information on advertising period to bid price information and generates a search result list by ordering search listings of the advertisers 130 in accordance with the computed class values. Thus, there is an effect that it is possible to faithfully implement the purpose of the present to provide the searcher 120 with a search result list in which search listings considering both bid price information and information on advertising period are extracted, sorted and exposed by the ranking module 650. A search result list will be described with reference to FIG. 9.

FIG. 9 is a view illustrating another example of a search result list provided to a searcher according to the present invention.

In a search result list of FIG. 9, search listings extracted in response to a search request are sorted in order. Also, search listings associated with the advertisers 130, which are determined as successful bidders by the bid control module 620, are extracted and sorted sequentially. That is, the order of each search listing is determined in accordance with a class value which is given thereto. Hereinafter, the order of each search listing will be described based on a class value thereof which is stored in the search information database 610 in FIG. 7.

In case that N is set at '4' by the system operator, the keyword advertising system 600 of the present invention extracts four search listings in order of a high class value by referring to bid price information and information on advertising period recorded in FIG. 7. Accordingly, search listings associated with the advertisers, 'naver cafeiN', 'two some place', 'daum cafe', and 'junjihyun fan cafe' are extracted sequentially. After this, the ranking module 650 determines locations in order of the extracted search listings and generates a search result list by displaying a corresponding search listing in a corresponding exposure location. For example, the class value of the search listing associated with the advertiser 'naver cafeiN' is '12,000' and highest. Thus, the search listing associated with the advertiser 'naver cafeiN' is first extracted as search results and the location thereof may be determined to be provided in the highest portion of a search result list where an actual click connection rate is high. On the other hand, the class value of the search listing associated with the advertiser 'junjihyun fan cafe' is '3,600' and lowest among the successful advertisers 130. Thus, the search listing associated with the advertiser 'junjihyun fan cafe' is last extracted and the location thereof may be determined to be provided to the lowest portion of a search result list where an actual click connection rate is low.

The present invention sorts search result listings in accordance with class values which are computed based on a bid price and advertising period. Also, the present invention provides the searcher 120 with the sorted search listings as search results. Thus, there is an effect that it is possible to bring excellent advertising effects to the advertiser 130 who maintains a high bid price or a long-term advertising contract.

Referring to FIG. 6 again, the search results providing module 660 provides the searcher 120 with the generated search result list. The search results providing module 660 serves to display the generated search result list on the terminal 125 of the searcher 120 as search results, in response to a search request (refer to FIG. 9).

The present invention determines the predetermined number of advertisers 130 as successful bidders based on the size of a bid price and advertising period. Also, the present invention sequentially extracts search listings of the successful advertisers 130 in order of predetermined class values in response to a search request. Thus, there is an effect that it is possible to determine an exposure location reasonably by bidding process. According to the prior art, since there is a time gap until advertising of a new advertiser starts after advertising of an existing advertiser ends, a search service provider cannot charge the advertiser advertising costs during the corresponding period. That is, the search service provider has to take disadvantage of losing potential profits. Accordingly, if possible, the longer the advertising period, the more profitable to the search service provider. The present invention improves the possibility that advertising of the advertiser making a long-term advertising contract may be exposed in an upper portion in search results. Thus, advertisers prefer long-term advertising and search advertising providers can obtain potential profits which may have been lost in the prior art.

Also, the keyword advertising system 600 of the present embodiment may further include the charge control module 260. The charge control module 260 generates predetermined advertising costs in accordance with a click for a particular search listing in a search result list and charges the advertiser 130 the generated advertising costs. The description related thereto will be as same as the aforementioned. Meanwhile, through generation of advertising costs and charging by the charge control module 260, the present invention enables a reasonable charge payment and brings more economical and effective advertising effects to the advertiser 130.

Operation flows of the keyword advertising system 200 such configured according to the present invention will be fully described.

Figure 10:
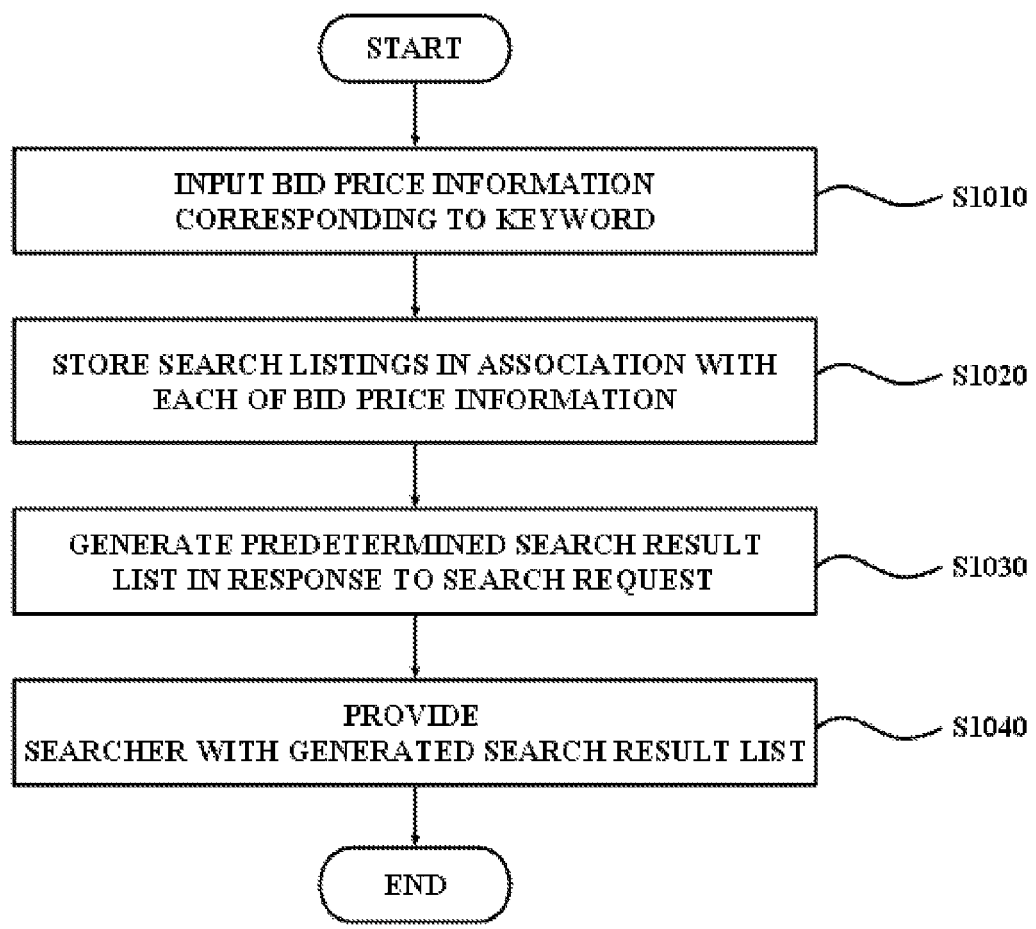
FIG. 10 is a flowchart illustrating a keyword advertising method according to a preferred embodiment of the present invention.

FIG. 10 is a flowchart illustrating a keyword advertising method according to a preferred embodiment of the present invention.

The keyword advertising method according to the present embodiment is performed by the aforementioned keyword advertising system 200.

First, the keyword advertising system 200 receives bid price information corresponding to a keyword from the advertisers 130 (S1010). This step S1010 is a procedure for receiving bid price information from each of the advertisers 130. The bid price information is associated with extraction of search listings and computation of advertising costs. For example, in case that a click is performed with respect to the extracted search listings, the interface 210 receives bid price information as an amount that the advertisers 130 can pay. Also, in this step S1010, the keyword advertising system 200 may further receive information on a keyword for which bid price information participates in a bid. Thus, it is guaranteed that the advertisers 130 can actively select a keyword associated with extraction of search listings.

Also, the keyword advertising system 200 maintains the search information database 220 for storing search listings associated with the advertisers 130 (S1020). This step S1020 is a procedure for storing search listings in association with each of the received bid price information. In this step, search listings of the advertisers 130 are stored in the search information database 220 to make a connection between bid price information and a keyword causing the search listings to be extracted (refer to FIG. 3).

In the next, the keyword advertising system 200 generates a search result list by referring to the search information database 220, in response to a search request from the searcher 120 (S1030). This step S1030 is a procedure for generating a search result list by extracting search listings corresponding to a keyword received from the searcher 120 to request a search and ordering the extracted search listings in predetermined order. Particularly, in this step S1030, the keyword advertising system 200 generates a search result list by extracting the predetermined number of search listings based on the size of a bid price and sequentially ordering the extracted search listings based on the CTR. Hereinafter, generation of a search result list will be described with reference to FIG. 11.

Figure 11:
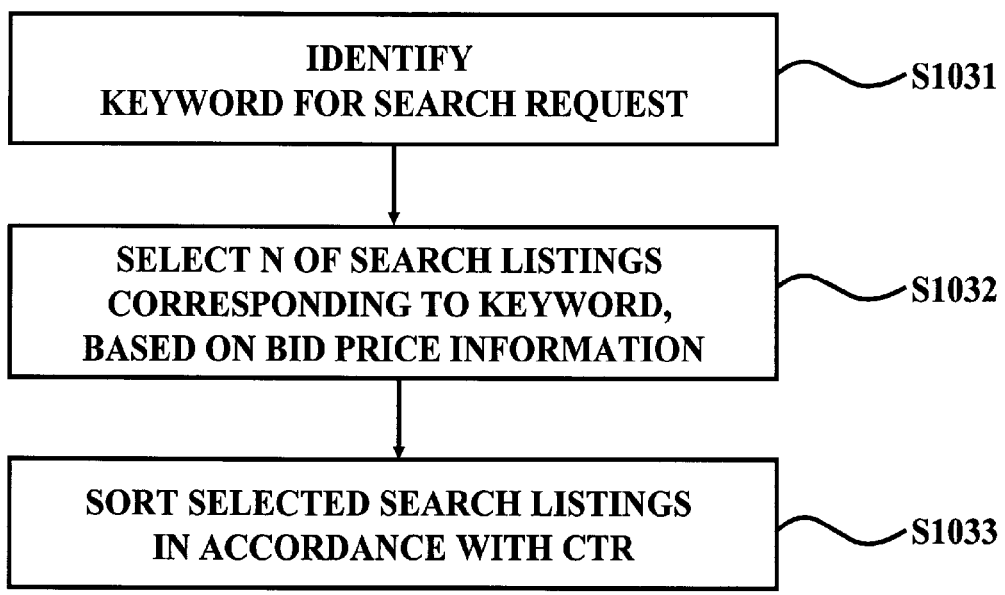
FIG. 11 is a flowchart illustrating another example of a method for generating a search result list.

FIG. 11 is a flowchart illustrating another example of a method for generating a search result list according to the present invention.

As illustrated in FIG. 11, the keyword advertising system 200 identifies a keyword received from the searcher 120 in association with a search request (S1031). This step S1031 is a procedure for confirming a keyword received on the search engine 110 to request a search and recognizing at least one search listing corresponding to the confirmed keyword from the search information database 220.

Also, the keyword advertising system 200 selects N of search listings from the at least one search listing corresponding to the confirmed keyword, based on bid price information (S1032). This step S1032 is a procedure for comparing unit click cost of bid price information and extracting search listings in order of high unit click cost in extracting N of search listings corresponding to the keyword. That is, the keyword advertising system 200 preferentially extracts search listings of the advertisers 130 who are willing to pay high advertising costs in extracting search listings. At this time, N is the number of search listings to be selected and flexibly set by the system operator considering a space of a search screen where a search result list is displayed.

In the next, the keyword advertising system 200 generates a search result list by ordering the selected search result listings in order of the CTR (S1033). This step S1033 is a procedure for ordering extracted search listings on a search result list, based on ratio of the number of actual clicks versus the number of exposures of search listings, in order to reflect popularity of the searcher 120 with respect to search listings.

According to the present invention, the predetermined number of search listings is selected based on a bid price and locations of the selected search listings in a search result list are determined based on the CTR. Thus, there is an advantage that it is possible to provide searchers with search results in which popularity of search listings and faithfulness of a corresponding information site are reflected.

Referring to FIG. 10 again, the keyword advertising system 200 provides the searcher 120 with the generated search result list (S1040). This step S1040 is a procedure for displaying the search result list, which is generated in response to a search request of the searcher 120, on the terminal 125 thereof 120 (refer to FIG. 5).

In extracting the predetermined number of search listings based on the size of a bid price in response to a search request, the present invention provides the searcher 120 with search listings, which are sequentially extracted in accordance with the CTR, as results of the search request. Thus, there is an advantage that it is possible to display the optimum search results that the searcher 120 wants in a location where the searcher 120 can easily recognize the search results.

Hereinafter, as another embodiment of the present invention, it will be described that search listings are extracted and locations thereof are determined by considering the advertising period of each search listings, besides the bid price thereof.

Figure 12:
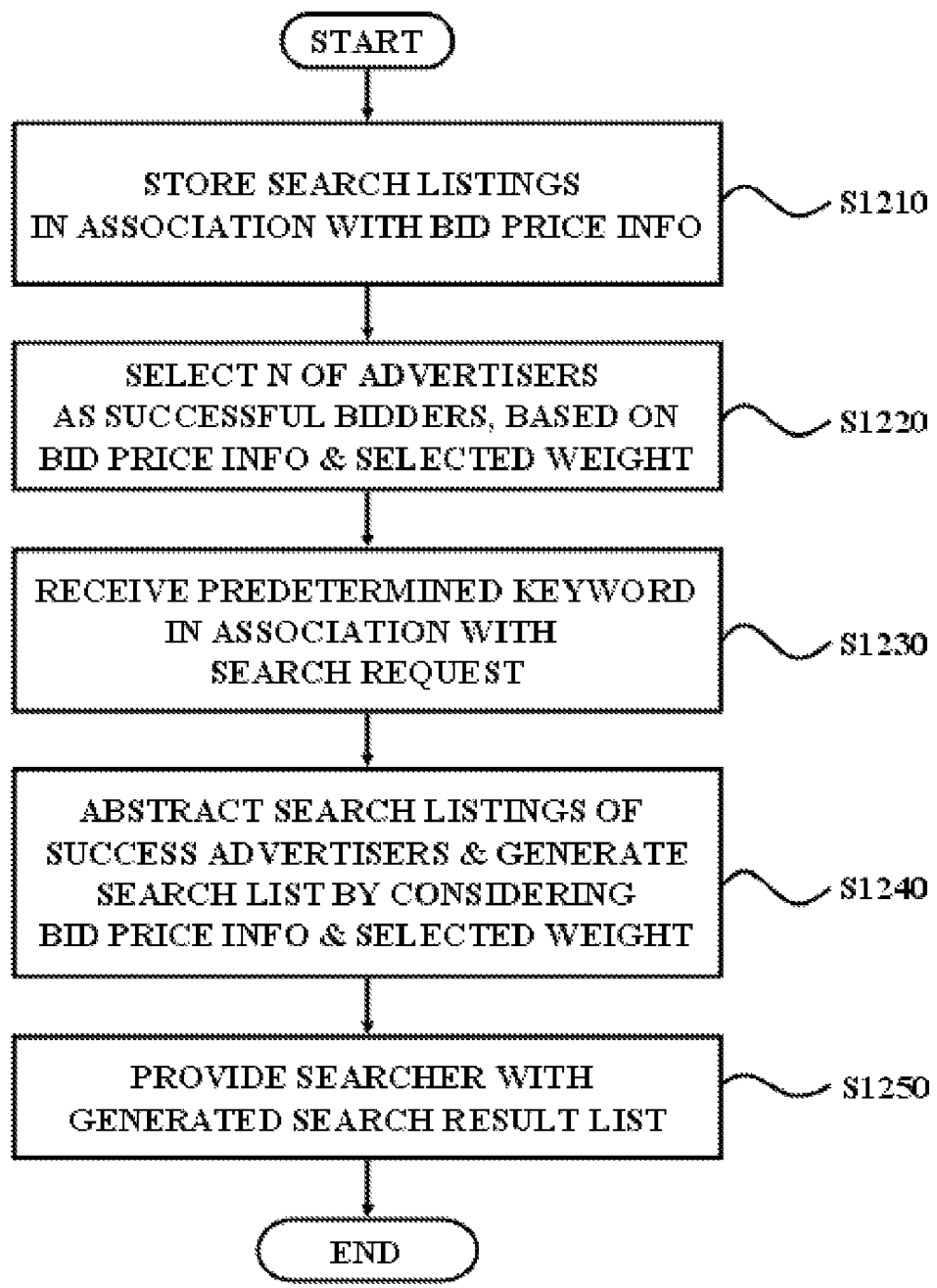
FIG. 12 is a flowchart illustrating another embodiment of a keyword advertising method according to the present invention.

FIG. 12 is a flowchart illustrating another example of a keyword advertising method according to the present invention.

First, the keyword advertising system 600 maintains the search information database 610 for storing bid price information, which is received in correspondence to a keyword, in association with search listings of advertisers 130 (S1210). This step S1210 is a procedure for storing the received bid price information in association with each of search listings. In this step, search listings of the advertisers 130 are stored in the search information database 610 to make a connection between bid price information and a keyword causing the search listings to be extracted (refer to FIG. 7).

Also, the keyword advertising system 600 selects N of advertisers 130 as successful bidders, based on bid price information and predetermined weight with respect to a keyword (S1220). This step S1220 is a procedure for giving rankings to the advertisers 130 who input bid price information in correspondence to a keyword, based on a predetermined criterion and selecting the advertisers 130 included within Nth rankings as successful bidders. At this time, the weight is a variable element in determining rankings of the advertisers 130. In the present embodiment, the weight may be information on advertising period of search listings associated with the advertisers 130. That is, the predetermined criterion to determine rankings of the advertisers 130 is the size of a class value which is computed by a computing combination of bid price information and advertising period of search listings. The keyword advertising system 600 determines the advertiser 130 with a high class value as a successful bidder.

In the next, the keyword advertising system 600 receives a keyword in association with a search request (S1230). This step S1230 is a procedure for receiving a keyword from the searcher 120 to request a search. The keyword advertising system 600 recognizes the keyword of the searcher 120 inputted in the search engine 110.

Also, the keyword advertising system 600 generates a search result list by ordering search listings associated with the N of the advertisers 130, which are selected as successful bidders in accordance with bid price information and weight, in response to the received keyword (S1240). This step S1240 is a procedure for determining the location of each extracted search listing in a search result list in generating a search result list by extracting the search listings. The location is determined in accordance with the size of a class value which is given to each of search listings. Search listings with high class values are configured to be sorted sequentially from an upper portion of a search screen. Hereinafter, a method of generating a search result list will be described with reference to FIG. 13.

Figure 13:
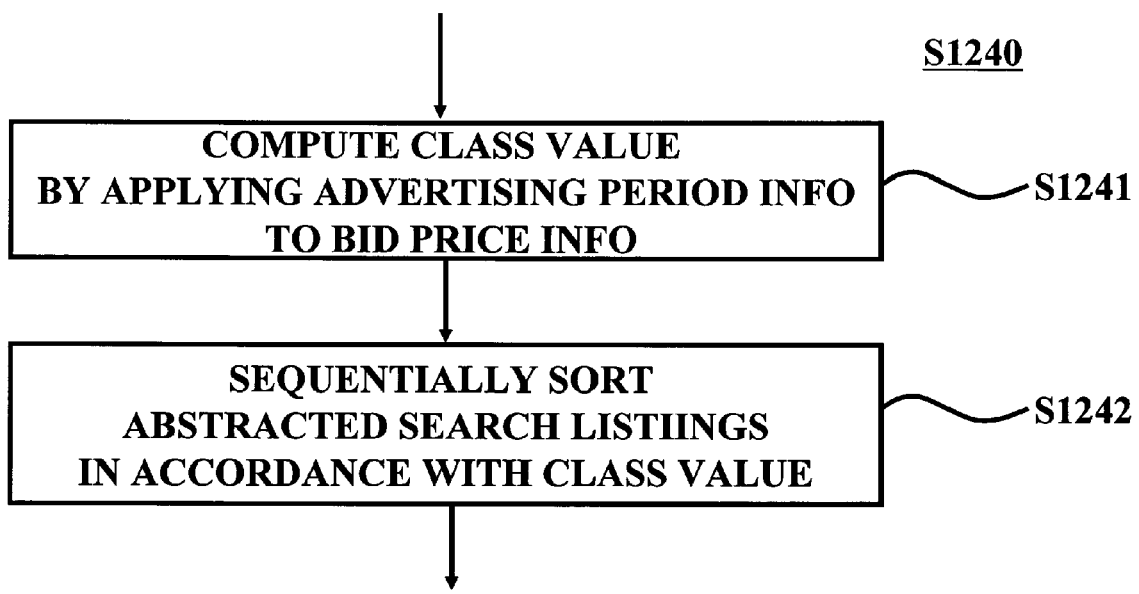
FIG. 13 is a flowchart illustrating another example of a method for generating a search result list.

FIG. 13 is a flowchart illustrating another example of a method for generating a search result list.

First, the keyword advertising system 600 computes a class value with respect to each of search listings associated with the advertisers 130 by applying information on advertising period to bid price information (S1241). This step S1241 is a procedure for setting weight as information on advertising period of search listings associated with the advertisers 130 and computing a class value by applying the advertising period corresponding to the search listing to the bid price stored in the search information database 610. The information on advertising period is received directly from the advertisers 130 or generated by estimating a period until predetermined advertising deposit disappears. The description related thereto will be as same as aforementioned.

Also, the keyword advertising system 600 sequentially sorts search listings associated with the advertisers 130 in accordance with the computed class values (S1242). This step S1242 is a procedure for ordering search listings sequentially from the highest portion of a search result list in accordance with the computed class values with respect to the search listings.

The present invention sorts search listings in accordance with class values which are computed based on a bid price and advertising period. Also, the present invention provides the searcher 120 with the sorted search listings as search results. Thus, there is an effect that it is possible to bring excellent advertising effects to the advertiser 130 who maintains a high bid price or a long-term advertising contract.

Referring to FIG. 12 again, the keyword advertising system 600 provides the searcher 120 with the generated search result list (S1250). This step S1250 is a procedure for displaying the generated search result list on the terminal 125 of the searcher 120 as search results, in response to a search request from the searcher 120 (refer to FIG. 9).

The present invention determines the predetermined number of advertisers 130 as successful bidders based on the size of a bid price and advertising period. Also, the present invention sequentially extracts search listings of the successful advertisers 130 in order of predetermined class values in response to a search request. Thus, there is an effect that it is possible to determine an exposure location reasonably by bidding process.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 14:
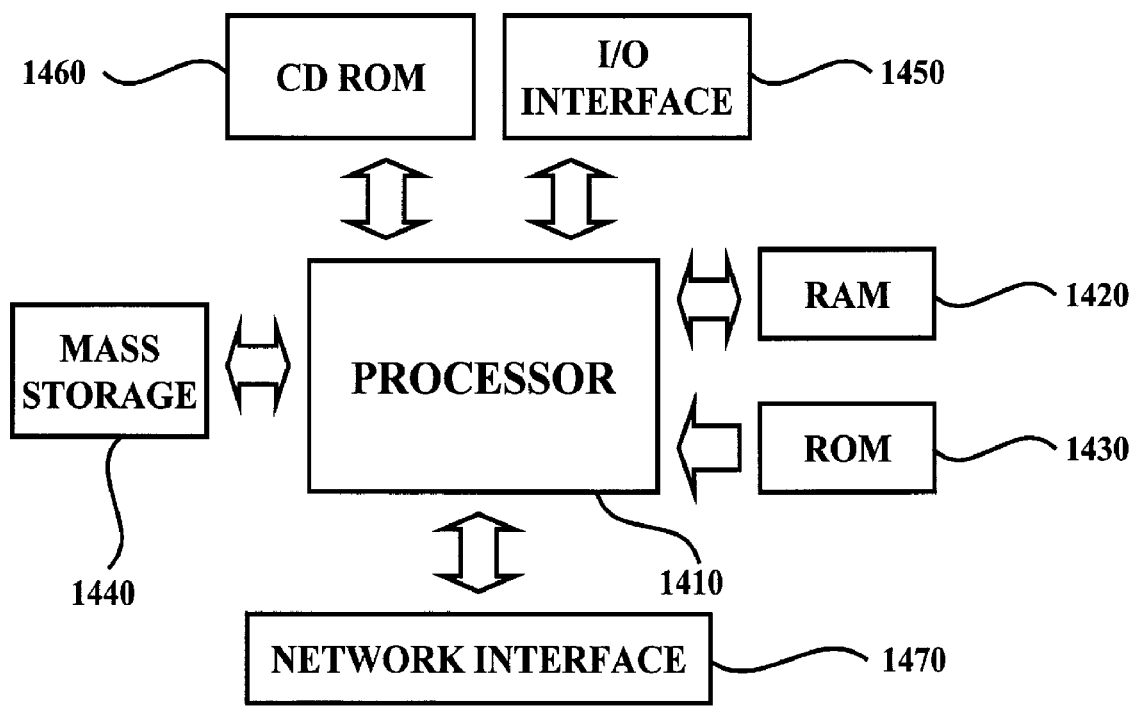
FIG. 14 is an inner block diagram of a general purpose computer which can be employed in implementing a keyword advertising method according to the present invention.

FIG. 14 is an inner block diagram of a general purpose computer which can be employed in implementing a keyword advertising method according to the present invention.

The computer system 1400 includes any number of processors 1410 (also referred to as central processing units, or CPUs) that are coupled to storage devices including primary storage (typically a random access memory, or "RAM 1420"), primary storage (typically a read only memory, or "ROM 1430"). As is well known in the art, ROM 1430 acts to transfer data and instructions uni-directionally to the CPU and RAM 1420 is used typically to transfer data and instructions in a bi-directional manner. Both of these primary storage devices may include any suitable type of the computer-readable media described above. A mass storage 1440 is also coupled bi-directionally to CPU and provides additional data storage capacity and may include any of the computer-readable media described above. The mass storage 1440 may be used to store programs, data and the like and is typically a secondary storage medium such as a hard disk that is slower than primary storage. A specific mass storage device such as a CD-ROM 1460 may also pass data uni-directionally to the CPU. Processor 1410 is also coupled to an interface 1450 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 1410 optionally may be coupled to a computer or telecommunications network using a network connection as shown generally at a network interface 1470. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

According to the present invention, there are provided keyword advertising system and method which can reflect popularity of search listings and faithfulness of a corresponding information site by selecting the predetermined number of search listings based on a bid price in response to a search request and determining locations of selected search listings in a search result list based on click through rate.

Also, according to the present invention, there are provided keyword advertising system and method which can bring better advertising effects to an advertiser who suggests a high bid price or maintains a long-term advertising contract by extracting search listings and determining locations thereof in accordance with class values and by providing a searcher with the sorted search listings as a result of a search request, in which the class value is computed based on a bid price and advertising period.

Also, according to the present invention, there are provided keyword advertising system and method which enables a reasonable payment by charging an advertiser in accordance with a click of a searcher with respect to search listings sorted in a search result list and brings economical and effective advertising effects to the advertiser.

Also, according to the present, a selection of an advertising search result list to be exposed as search results and ordering thereof can be performed in accordance with respectively different criteria. Thus, it is possible to make a balance between profits of an advertiser associated with Internet search advertising and those of a searcher.

Also, according to the present invention, since a search listing is determined in accordance with a bid price, it is possible to protect profits of an advertiser to some degree. At the same time, it is also possible to protect profits of a searcher by determining order of search listings in accordance with click through rate.

Also, according to the present invention, it is possible to improve the possibility that advertising of an advertiser making a long-term advertising contract may be exposed in an upper portion as search results. Thus, advertisers prefer long-term advertising and search advertising providers can obtain potential profits which may have been lost in the prior art.

What is claimed is:

1. A keyword advertising system extracting search listings in response to a search request, the system comprising:

memory storing a search information database, said search information database storing at least one bid received from advertisers, said at least one bid being associated with a cost per click advertising, said each bid being associated with a keyword, a bid amount and a search listing;

a bid control module selecting a predetermined number of search listings primarily according to said bid amount and an estimated advertising period;

one or more processors for processing data;

a ranking module generating an ordered search result list, said ranking module ordering said selected search listings in said search result list according to said selected search listings' respective bid amounts and said estimated advertising period; and a computation control module computing said advertising period for said received bids, said computation control module estimating advertising costs using said bid amount of said advertiser and average number of clicks information during a predetermined previous period, said computation control module calculating said estimated advertising period using deposit from the advertiser and said estimated advertising costs.

2. A keyword advertising method extracting search listings in response to a search request, the method comprising the steps of:

maintaining a search information database, said search information database storing at least one bid received from advertisers, said at least one bid being associated with a cost per click advertising, said each bid being associated with a keyword, a bid amount and a search listing;

computing an estimated advertising period of said at least one bid;

selecting a predetermined number of search listings primarily according to said bid amount and estimated advertising period;

receiving search request associated with a keyword from a searcher;

ordering said selected search listings in said search result list according to said selected search listings' respective bid amounts and said estimated advertising period; and displaying said ordered search listings on a display, wherein the steps of selecting and of ordering are performed by a server including a processor, and the step of computing an estimated advertising period comprising the steps of:

estimating advertising costs using said bid amount of said advertiser and average number of clicks information during a predetermined previous period; and calculating said estimated advertising period using deposit from the advertiser and said estimated advertising costs.

3. One or more storage media having stored thereon a computer program that, when executed by one or more processors, causes the one or more processors to perform acts including:

maintaining a search information database, said search information database storing at least one bid received from advertisers, said at least one bid being associated with a cost per click advertising, said each bid being associated with a keyword, a bid amount and a search listing;

computing an estimated advertising period of said at least one bid;

selecting a predetermined number of search listings primarily according to said bid amount and estimated advertising period;

receiving search request associated with a keyword from a searcher;

ordering said selected search listings in said search result list according to said selected search listings' respective bid amounts and said estimated advertising period; and displaying said ordered search listings on a display, wherein the step of computing an estimated advertising period comprising the steps of:

estimating advertising costs using said bid amount of said advertiser and average number of clicks information during a predetermined previous period; and calculating said estimated advertising period using deposit from the advertiser and said estimated advertising costs.

* * * * *